Jan. 5, 1960 C. V. DAVID 2,919,546
SERVO POWERED JET DEFLECTING NOZZLE
Filed Dec. 23, 1957 3 Sheets-Sheet 1

INVENTOR.
CONSTANT V. DAVID
BY
Knox & Knox

INVENTOR.
CONSTANT V. DAVID
BY
Knox & Knox

Jan. 5, 1960

C. V. DAVID 2,919,546

SERVO POWERED JET DEFLECTING NOZZLE

Filed Dec. 23, 1957

INVENTOR.
CONSTANT V. DAVID
BY
Knox & Knox

United States Patent Office 2,919,546
Patented Jan. 5, 1960

2,919,546

SERVO POWERED JET DEFLECTING NOZZLE

Constant V. David, San Diego, Calif., assignor to Ryan Aeronautical Co., San Diego, Calif.

Application December 23, 1957, Serial No. 704,661

5 Claims. (Cl. 60—35.55)

The present invention relates generally to aircraft jet engines and the like and more particularly to a servo powered jet deflecting nozzle.

Many devices have been constructed to deflect the exhaust gases of a jet engine, thereby providing directional control of an aircraft, either as a full or supplementary control medium. Due to the forces and power involved, such devices must have considerable strength and durability and are consequently heavy and unwieldly. Movable nozzles of this type require powerful actuating devices such as hydraulic jacks or electric motors which add further to the installation weight and complicate the aircraft structure, both in manufacture and in servicing requirements. It is proposed in the present disclosure to utilize the jet exhaust gas itself to provide the majority of the power required to move the nozzle. This is accomplished by suspending small aerodynamic servo elements in the jet stream and controlling the servo elements only, the reaction of the jet stream on the servo elements providing the power to operate the nozzle. Such an arrangement is particularly suitable for control of an aircraft in low speed flight, as in vertical take-off and transition to horizontal flight, the lack of heavy actuating devices being important since this type of aircraft has critical weight problems.

The primary object of this invention is to provide a jet deflecting nozzle in which the movable nozzle portion is controlled by a servo mechanism but actuated by the jet thrust itself, so reducing to a minimum the power required to operate the nozzle.

Another object of this invention is to provide a jet deflecting nozzle in which the servo mechanism is employed to control the angular setting of small aerodynamic vanes suspended in the jet stream with the vanes being coupled directly to the movable nozzle, whereby the controlled angular offset of the vanes in the jet stream causes a shift of the vanes and nozzle together.

A further object of this invention is to provide a jet deflecting nozzle in which the servo mechanism is aerodynamically balanced to reduce the actuating power to an absolute minimum.

Another object of this invention is to provide a jet deflecting nozzle which is capable of any desired degree of vertical or horizontal jet deflection to facilitate full pitch and yaw control in slow speed or vertical flight, or to assist the conventional control surfaces in high speed flight.

Finally, it is an object to provide a jet deflecting nozzle of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 3:
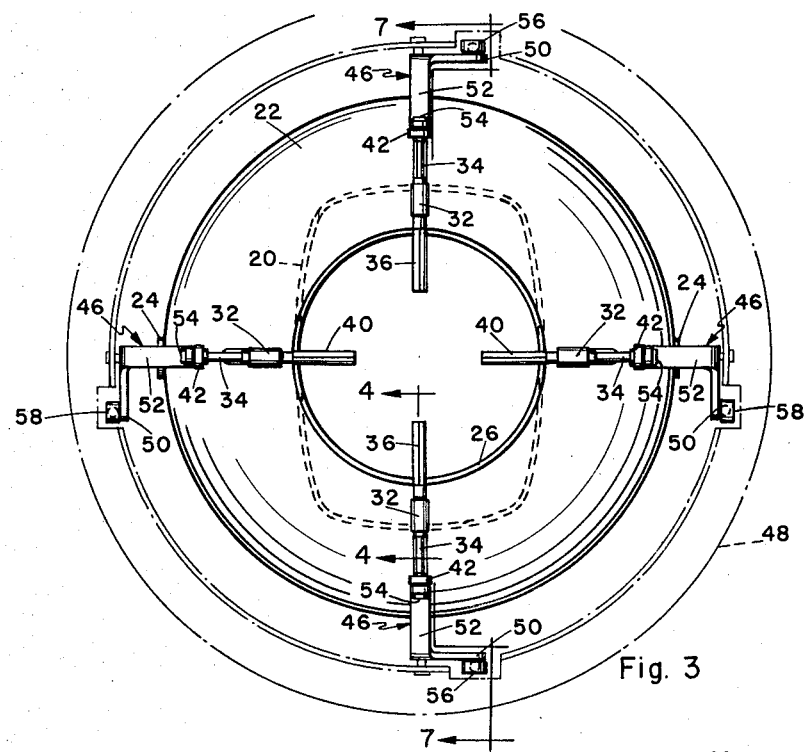
Figure 3 is an enlarged rear elevation view of the nozzle assembly.

Referring now to the drawings in detail, it should first be noted that the specific structure illustrated and described is proposed as evidentiary of the complete reduction to practice of this invention in representing at least one practical way of implementing the concepts in the invention. The device is mounted on the end of a jet engine tailpipe 10, as illustrated, and comprises a cylindrical sleeve 12 shaped to fit the specific tailpipe, said sleeve having a ball portion 14 integral therewith, the ball portion being concentric with said tailpipe and clear of the exhaust stream. Fitted over the ball portion 14 is a generally spheroidal truncated inner shell 16, which is pivotally mounted on diametrically opposed bearings 18 on a vertical axis normal to the axis of the tailpipe 10. The inner shell 16 has a vertically elongated, generally rectangular outlet 20 at the rear thereof, said outlet being coaxial with the tailpipe 10 when said inner shell is in neutral position. Fitted over the inner shell 16 is a generally spheroidal, truncated outer shell 22 which is pivotally mounted on said inner shell by bearings 24 diametrically opposed on a horizontal axis normal to and coplanar with the axis of the bearings 18. The outer shell 22 has a horizontally elongated, generally circular outlet 26 at the rear thereof, which registers with the outlet 20, as shown in Figure 3. Thus the outer shell 22 is mounted on the inner shell 16 and the inner shell is mounted on the ball portion 14 in such a manner that the two shells comprise a nozzle assembly which is universally movable about the center of radius of the shells.

Fixed to the inner shell 16 adjacent its forward edge are two brackets 28 to which are secured rearwardly and inwardly extending support arms 30, the brackets being diametrically opposed on an axis parallel to the axis of the bearings 18 and said support arms being parallel to the longitudinal axis of the tailpipe 10. At the free end of each support arm 30 is a bearing collar 32 in which is journalled a shaft 34 extending radially of the axis of the tailpipe 10. Mounted on the inner end of each shaft 34 is a nozzle actuating servo vane 36, preferably of airfoil shape in cross section and having its longitudinal or chordwise axis normally parallel to the direction of exhaust gas flow. The servo vanes 36 are thus diametrically opposed and are disposed so as to be completely in the jet stream, as shown in Figure 3.

Fixed to the rear of the outer shell 22 adjacent the outlet 26 are two rearwardly extending support arms 38 which are diametrically opposed on an axis parallel to the axis of bearings 24. At the end of each support arm 38 is a further bearing collar 32 in which is journalled a shaft 34, and mounted in the inner end of each shaft is a servo vane 40 disposed in the jet stream. As illustrated, the servo vanes 36 are used for yaw control and the servo vanes 40 are used for pitch control, as will be apparent hereinafter.

Figure 1:
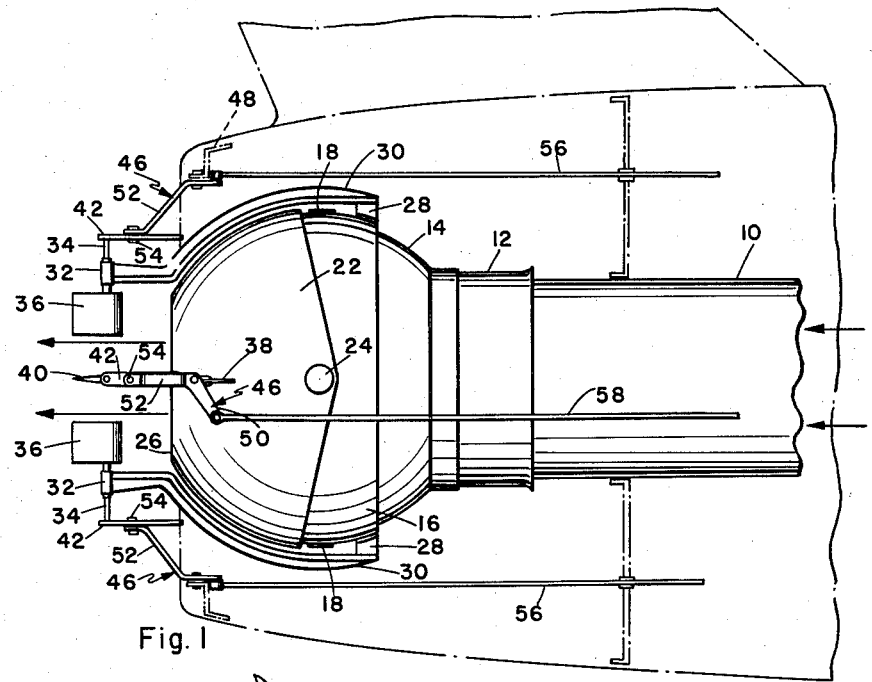
Figure 1 is a side elevation view of the nozzle structure mounted on a jet engine tailpipe, indicated in broken line.
Figure 2:
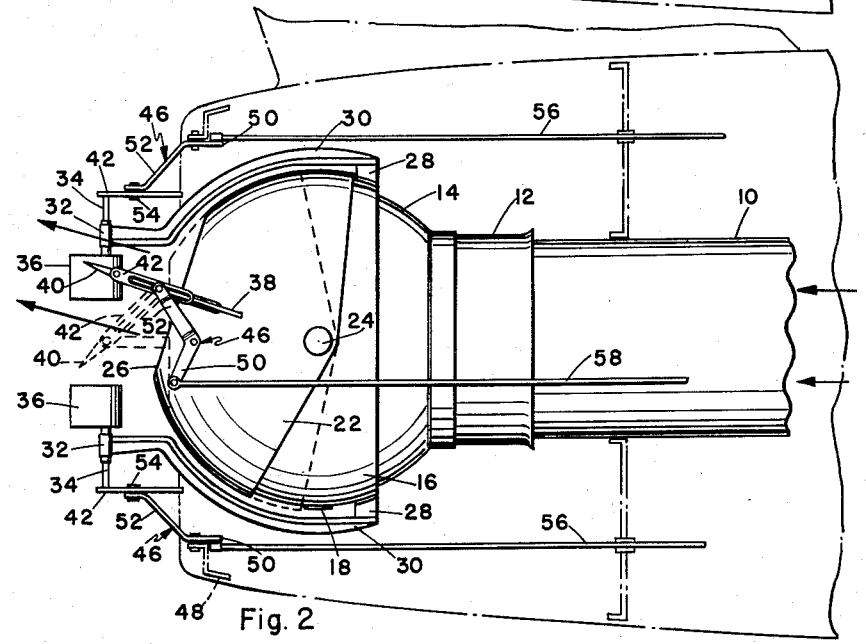
Figure 2 is a view similar to Figure 1, but with the nozzle offset.

For simplicity, the vane actuating mechanism is shown as similar for each vane. Each shaft 34 extends radially outwardly and has fixed to its outer end a forwardly extending guide bar 42 having a longitudinal slot 44. Adjacent each guide bar 42 is a generally L-shaped bell crank 46 pivotally mounted substantially at its center to a suitable part of the aircraft structure, such as the fuselage frame 48 shown in broken line in Figures 1-3. The bell crank 46 has an operating arm 50 and a guide arm 52, said guide arm having at its end a pin 54 which rides in the slot 44 of the respective guide bar 42. Connected to each operating arm 50 is a control rod, those for the bell cranks coupled to the servo vanes 36 being the yaw control rods 56 and those for the bell cranks coupled to the servo vanes 40 being the pitch control rods 58. The control rods 56 and 58 are connected to suitable pilot actuated controls of any well known type.

Figure 4:
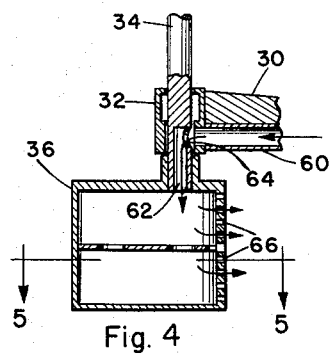
Figure 4 is an enlarged fragmentary sectional view taken on the line 4—4 of Figure 3.
Figure 5:
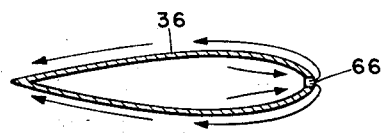
Figure 5 is an enlarged sectional view taken on the line 5—5 of Figure 4.
Figure 7:
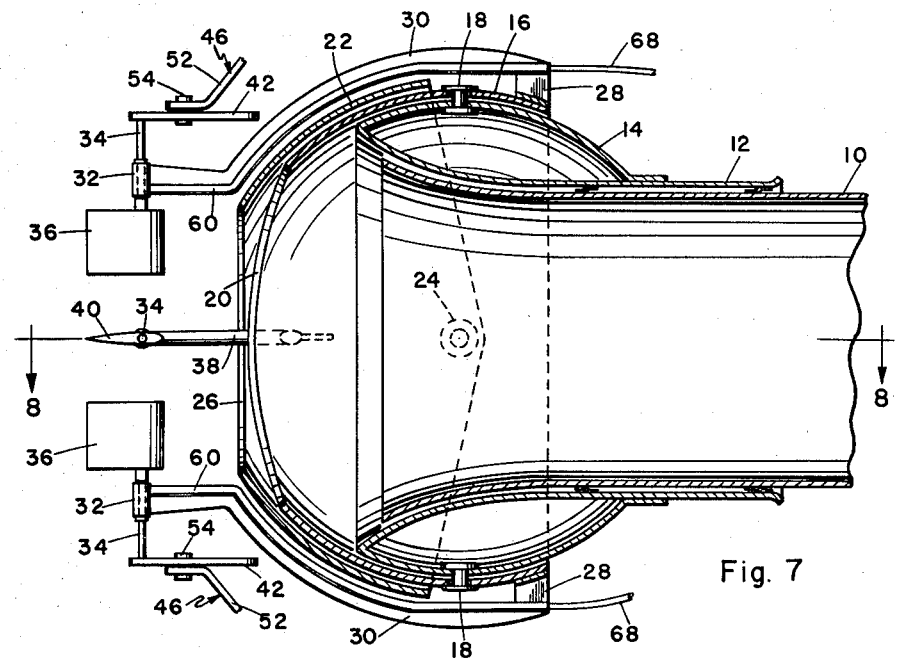
Figure 7 is a fragmentary sectional view taken on the line 7—7 of Figure 3.
Figure 8:
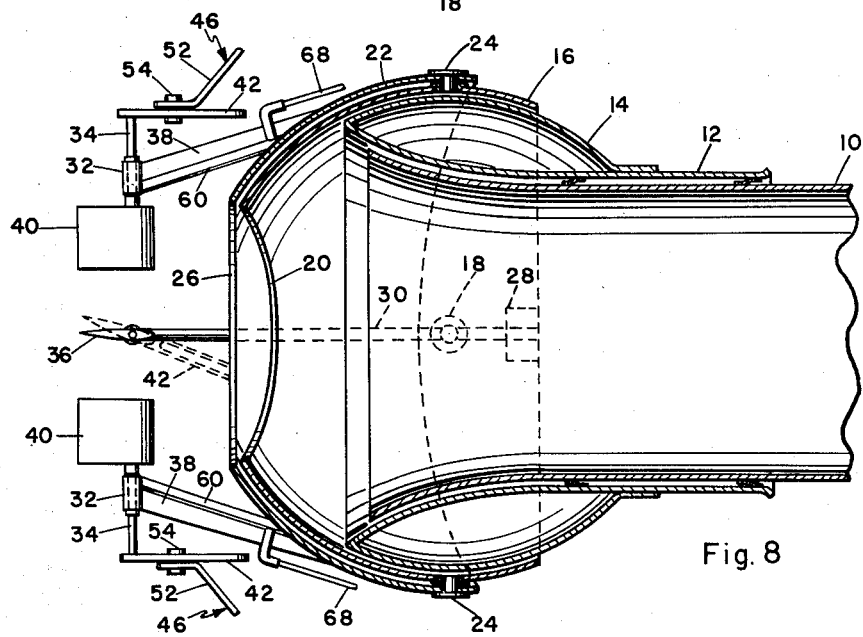
Figure 8 is a sectional view taken on the line 8—8 of Figure 7.

Since the servo vanes 36 and 40 are continually exposed to the hot exhaust gases, some means for cooling the vanes is desirable. The structure illustrated in Figures 4 and 5 shows a pipe 60 built integrally with the support arm 30 and communicating with the interior of the bearing collar 32. The shaft 34 has an internal bore 62 at the base of which is a radially extending slot 64 aligned with the pipe 60, so that cooling air may be pumped from any suitable source through said pipe and through the bore 62 to the interior of the servo vane 36. At the leading edge of the servo vane 36 are a plurality of vents 66 through which the cooling air is exhausted, and the flow of exhaust gases past the servo vane carries this air back over the surface of the vane in the manner of a boundary layer, as indicated by the directional arrow. This boundary layer of cool air serves to protect the surface of the servo vane 36 from the heat of the exhaust gases. Of course, a similar arrangement may be used for the servo vanes 40 with further pipes 60 in the support arms 38 and fed through supply pipes 68.

Figure 6:
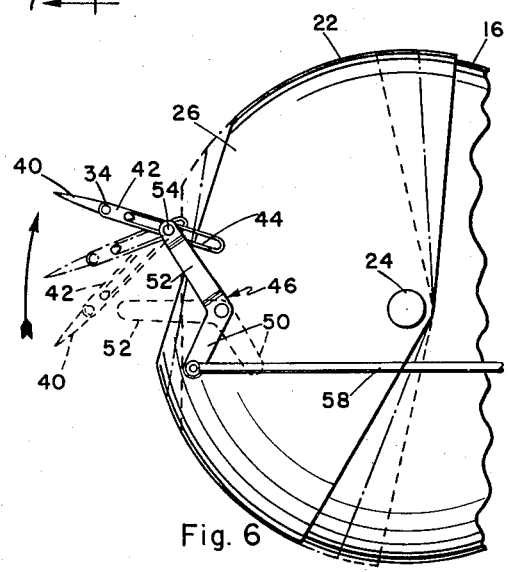
Figure 6 is an enlarged fragmentary side elevation view similar to a portion of Figure 1, showing the relative motion of the nozzle and servo mechanism.

In normal forward thrust position, the inner shell 16, outer shell 22 and servo vanes 36 and 40 are all in neutral position, as in Figures 1, 3, 7 and 8. To deflect the jet stream, say upwardly, the outer shell 22 must be tilted so that the outlet 26 is turned upwardly, as in Figures 2 and 6. This is accomplished by moving the pitch control rods 58 rearwardly to turn the bell cranks 46, so that the guide bars 42 are offset to the position shown in dash line in Figures 2 and 6. In doing this, the pins 54 slide to the forward ends of the slots 44. The servo vanes 40 are now angularly disposed to the jet stream, the exhaust gases tend to force the servo vanes upward and, in doing so, cause the outer shell 22 to turn. Since the position of each pin 54 is fixed while the outer shell 22 turns, the guide bar 42 is gradually returned inwardly, so decreasing the angle of the servo vane 40 relative to the jet stream, as shown in the intermediate position indicated in broken line in Figure 6. As the motion of the outer shell 22 continues, the servo vane 40 is finally brought into line once more with the jet stream, now offset in its upwardly angled direction, as indicated in full line in Figures 2 and 6, thus arresting the deflection of the jet stream at the position determined by the pilot's control setting. Any directional deflection is accomplished merely by turning the appropriate servo vanes and the respective shell element is turned entirely by the reaction of the exhaust gases against the servo vanes. The only actuating power required is that needed to operate the small servo vanes and, since the servo vanes may be aerodynamically balanced, even this small force may be reduced to that required to overcome the mechanical linkage friction to the vanes. Due to the elongation of the generally rectangular outlets 20 and the circular outlet 26, the effective outlet area is reasonably constant and as near circular as practically possible at all offset positions of the shell elements, so that the performance of the jet engine is not impaired. It is noteworthy that, should nozzle area control be desired as when an afterburner is used, this area control can be achieved by merely dividing the outer shell into two eyelid portions and securing independent movement thereof by differential action of the rods 58 and vanes 40.

It should be understood that the servo vane actuating mechanism as shown is illustrative only and the servo vanes may be operated by other means, such as hydraulic or electrical devices, and it may be found necessary to incorporate a follow-up or closed loop type control system to prevent instability, such devices being well known in the art. Further, the specific mounting of the servo vanes is not necessarily limited to that shown, the only requirements being that the vanes are pivotally suspended in the jet stream and are coupled directly to the respective nozzle element to move that element by servo action of the jet stream.

The device is particularly suitable for directional control and stabilization of an aircraft in vertical or horizontal flight, when the conventional control surfaces are ineffective due to lack of a slipstream, and may also be used to supplement the normal flying controls when necessary.

I claim:

1. A servo controlled, jet actuated, jet deflecting nozzle, comprising: a fixed gas conducting portion; a movable nozzle operatively mounted on said fixed portion and having a gas outlet; servo vanes mounted to move with said movable nozzle on axes extending diametrically of said outlet so as to be contacted by the gas jet stream; and actuating means mounted on said fixed conducting portion and operatively connected to said servo vanes to move the servo vanes to selected positions relative to the direction of flow of the jet stream, whereby the jet stream itself biases the servo vanes and the nozzle to shift according to the controlled shifting of the servo vanes; and feed back means between said actuating means and said fixed portion and operatively connected to return said servo vanes to neutral position with respect to the jet stream as the nozzle moves to its new position.

2. A servo powered jet deflecting nozzle, comprising: a fixed gas conducting portion; a movable nozzle universally mounted on said fixed portion and having a gas outlet therein; a plurality of servo vanes pivotally mounted on said movable nozzle, said servo vanes being mounted on two axes normal to each other and extending diametrically of said outlet; all of said servo vanes being positioned with respect to said outlet so as to be immersed in the gas jet stream; actuating means mounted on said fixed conducting portion and operatively connected to said servo vanes to move the servo vanes to selected angular positions relative to the jet stream, whereby reaction of the jet stream against said servo vanes biases the vanes and the nozzle toward an angularly offset position; and feedback means between said actuating means and said fixed portion and operatively connected to return said servo vanes to a position in line with the jet stream as said nozzle moves to the offset position.

3. A servo powered jet deflecting nozzle, comprising: a fixed, generally cylindrical gas conducting element having a spheroidal ball end portion; a truncated spheroidal nozzle universally mounted on said ball end portion and having a gas outlet therein; a plurality of servo vanes pivotally mounted on said truncated spheroidal nozzle, certain of said servo vanes being pivotal on one axis and others of said servo vanes being pivotal on an axis substantially normal to the first axis; all of said servo vanes being positioned with respect to said outlet so as to be immersed in the gas jet stream; actuating means mounted on said fixed conducting portion and operatively connected to said servo vanes to move the servo vanes to selected angular positions relative to the jet stream, whereby reaction of the jet stream against said servo vanes biases the vanes and the nozzle toward an angularly offset position; and feedback means between said actuating means and said fixed portion and operatively connected to return said servo vanes to a position in line with the jet stream as said nozzle moves to the offset position.

4. A servo powered jet deflecting nozzle, comprising: a fixed, generally cylindrical gas conducting element having a spheroidal ball end portion; a truncated spheroidal inner shell pivotally mounted on said ball end portion on a diametrical axis substantially normal to the axis of said gas conducting element; a truncated spheroidal outer shell pivotally mounted on said inner shell on a diametrical axis substantially normal to the pivotal axis of the inner shell; said inner and outer shells having corresponding gas outlets; a pair of opposed servo vanes mounted on said inner shell and pivotal on an axis substantially parallel to the pivotal axis of the inner shell; a second pair of opposed servo vanes mounted on said outer shell and pivotal on an axis substantially parallel to the pivotal axis of the outer shell; all of said servo vanes being in alignment with said outlets so as to be immersed in the gas jet stream; actuating means mounted on said fixed conducting portion and operatively connected to said servo vanes to move the pairs of servo vanes individually and collectively to selected angular positions relative to the jet stream, whereby reaction of the jet stream against said vanes biases the vanes and the respective shell elements toward angularly offset positions; and feedback means between said actuating means and said fixed portion and operatively connected to return said servo vanes to positions in line with the jet stream as said shell elements move to the offset positions.

5. A jet deflecting nozzle according to claim 4 and wherein said outlets have constant nozzle area when said shells are pivoted.

References Cited in the file of this patent

UNITED STATES PATENTS

| | | |
|---|---|---|
| 2,086,724 | McAulay | July 13, 1937 |

FOREIGN PATENTS

| | | |
|---|---|---|
| 319,853 | Italy | July 23, 1934 |